United States Patent [19]

Díaz et al.

[11] Patent Number: 4,977,250

[45] Date of Patent: Dec. 11, 1990

[54] PROCESS FOR CONTROLLED DEPOLYMERIZATION OF POLYSACCHARIDES

[75] Inventors: Víctor B. Díaz; Ricardo H. Dománico, both of Buenos Aires, Argentina; Fernando Fussi, Lugano, Switzerland

[73] Assignee: Aorca S.A., Buenos Aires, Argentina

[21] Appl. No.: 122,466

[22] Filed: Nov. 19, 1987

[30] Foreign Application Priority Data

Nov. 21, 1986 [AR] Argentina .............................. 305985

[51] Int. Cl.$^5$ ...................... C08B 37/10; C07H 1/00; C07H 3/00
[52] U.S. Cl. ........................................ 536/21; 536/56; 536/124
[58] Field of Search ............................ 536/21, 124, 56

[56] References Cited

U.S. PATENT DOCUMENTS

| | | | |
|---|---|---|---|
| 4,446,126 | 5/1984 | Jordan | 514/822 |
| 4,446,314 | 5/1984 | Jordan | 536/21 |
| 4,652,555 | 3/1987 | Goulay et al. | 536/21 |
| 4,727,063 | 2/1988 | Naggi et al. | 536/21 |
| 4,745,098 | 5/1988 | Michaeli | 514/822 |
| 4,745,105 | 5/1988 | Griffin et al. | 514/56 |
| 4,745,107 | 5/1988 | Foley et al. | 514/56 |
| 4,767,463 | 8/1988 | Brode et al. | 424/71 |
| 4,816,446 | 3/1989 | Feller et al. | 514/56 |

FOREIGN PATENT DOCUMENTS

| | | | |
|---|---|---|---|
| 515424 | 8/1955 | Canada | 536/57 |
| 731639 | 4/1966 | Canada | 536/57 |
| 0268885 | 6/1988 | European Pat. Off. | |

OTHER PUBLICATIONS

Unit Processes in Organic Synthesis, P. H. Groggins, 1938, pp. 368 & 376.

The Merck Index, Merck & Co., Inc., Rahway, N.J., 1960, p. 946.

Primary Examiner—Ronald W. Griffin
Assistant Examiner—Pamela S. Webber
Attorney, Agent, or Firm—Birch, Stewart, Kolasch & Birch

[57] ABSTRACT

A process for controlled chemical depolymerization of naturally occurring linear polysaccharides, more specifically glycosaminoglycans. Depolymerized glycosaminoglycans, such as heparins which are obtained according to the process and pharmaceutical compositions which contain such depolymerized heparins. In the process, the polysaccharides are subjected to the action of atomic oxygen which, preferably, is derived from hypochlorous acid.

11 Claims, 1 Drawing Sheet

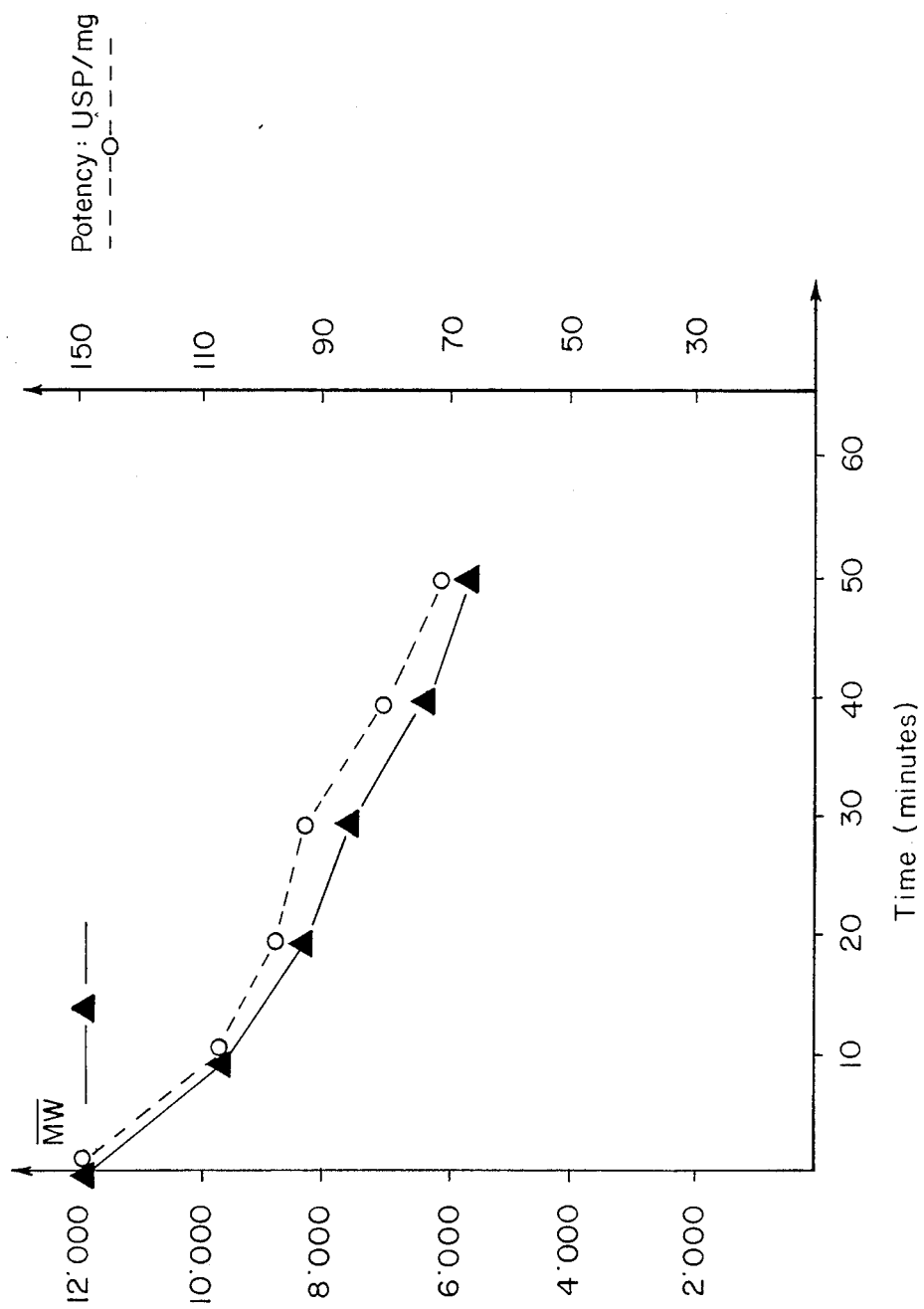

PROCESS FOR CONTROLLED DEPOLYMERIZATION OF POLYSACCHARIDES

FIELD OF THE INVENTION

The present invention is related to a novel process for controlled chemical depolymerization of natually occurring, linear polysaccharides, more specifically glycosaminoglycans (GAG).

This invention embraces the depolymerized heparins obtained according to the process and pharmaceutical compositions containing such depolymerized heparins.

DESCRIPTION OF THE PRIOR ART

In actual practice, controlled depolymerization of heparin and some other GAG is a difficult task for many reasons:

(a) Chemical agents, as presently being used (nitrousa acid, β-elimination, oxidation, acidic or alkaline hydrolysis) modify the molecular structure around the affected bonds or in other regions that are local for the activity, therefore creating artefacts.

(b) Enzymatic cleavage is difficult to control when depolymerization must be stopped at a pre-selected point. Furthermore, heparin, HS, DS, are not easily affected by currently available enzymes.

(c) Fractioning through physical or chemical-physical methods, as for instance molecular sieving, ultra filtration or selective precipitation are not suitable for a large-scale economical production.

BACKGROUND OF THE INVENTION

A controlled depolymerization of some natural GAGs, as heparin, heparan sulphate (HS), dermatansulphate (DS) is an attractive but, in practice, difficult task.

Interest arises from some experimental observations, according to which bioavailability and biological effects for some GAGs, when orally or parenterally administered in experimental models or in humans, are dependent on the mean molecular weight ($\overline{MW}$). As an example, commercial heparin is a well known anticlotting agent, due to its activating properties, as a co-factor, on a powerful protease inhibitor, anti-thrombin III (At-III). Heparin is a sulphated GAG, with $\overline{NW} = 12.000$ D, corresponding to about 20 disaccharide units and in hemocoagulation it inhibits 5 factors, namely F XII, F XI, FIX, F X, FII. Recently, it was discovered that heparin fractions having $\overline{NW} = 4.000 - 6.000$ D (low molecular weight heparins, LMWH), affect inhibition on some factors but not on others, and peculiarly on some key factors in venous thrombosis onset, such as F X. Consequently, LMWH could be considered as effective anti-thrombotic agents with less risk of hemorraghe than commercial heparin.

It has also been found that the half-life in bloodstream for LMWH is longer than for normal heparin. Therefore, a long term therapy can be established, avoiding drip infusions and rebound phenomena.

A further advantage for LMWH is the absence of interference in platelet agregation, an undesirable effect which in the past, caused severe thrombocytopenia in some patients during heparin administration.

SUMMARY OF THE INVENTION

Consequently, the chemical process that is the object of the present invention comprises a controlled depolymerization of heparin and other linear polysaccharides obtained by means of atomic oxygen as the agent for glycosidic bond cleavage. The easiest way to obtain atomic oxygen is by means of the use of hypochlorous acid HClO to which the reported example is referred.

The advantages of the process of the present invention, are for instance an easy stopping of the reaction at any pre-selected molecular weight, high yields, absence of side reactions, and absence of inorganic catalysts (heavy metals). A further advantage is that as long as the reaction proceeds, no darkening is present. Therefore, a white clear product is obtained and consequently the need for complicated bleaching procedures are avoided.

The process of the present invention which enables the above advantages, is carried out under specific reaction conditions which can be summarized as follows:

(1) The aqueous solution is buffered at a pH between 4 and 7 in order to keep the pH constant during the entire process. At a pH below 4 or in case of lowering the pH below 4, undesired side reactions occur due to chlorine liberation from hypochlorous acid. The desired reaction (pH 4 to 7) is: $HClO \rightarrow HCl + O$. On the other hand, the undesired reaction (pH below 4) which causes chlorination, is: $HClO + HCl \rightarrow Cl_2 + H_2$.

(2) The reaction is operated at a molar ratio of HClO/polysaccharide = 10:1 or higher. The entire estimated amount of HClO solution is added to the solution of polysaccharides.

(3) The reaction can be instantaneously stopped at a pre-selected level by means of the addition of a reducing agent such as for instance, sodium bisulphite $NaHSO_3$, in order to destroy the excess HClO.

(4) The depolymerized polysaccharide is precipitated by adding 2 volumes of a water-miscible solvent such as ethanol, methanol or acetone, then collected and washed with a pure solvent and dried under vaccum.

(5) The operating temperature range is between 25° C. and the boiling point of the mixture. A temperature range between 50° C. and 80° C. is usually used in order to accelerate the reaction and avoid refluxing. The temperature of the HClO solution before the addition to the polysaccharide solution must be kept below +5° C.

(6) The partial and final determinations of mean molecular weight $\overline{MW}$ can be made by viscosimetry according to E. A. Johnson and B. Mulloy—Carbo hydr. Re. 51, 119 (1976).

The following example, not limiting for the process, describes the manner of proceeding:

EXAMPLE 15 gr. Sodium Heparin USP, $\overline{MW} = 12.000$ Daltons (determined by viscosimetry) were dissolved in 80 ml of 0.1 M citrate/phosphate buffer, pH = 6.0. 20 ml of 1 M sodium hypochlorite were prepared apart, stabilized at 6 with HCl and kept at 0° C. The heparin solution was added to this solution. In this way, the final solution comprised 0.01 moles heparin and 0.2 moles HClO. It was heated to 80° C. and 10 ml sample were isolated every 10 min. Immediately, 1 ml of a 2 M $NaHSO_3$ solution was added to each sample and then 20 ml ethanol. The precipitate was collected, washed thrice with 5 ml ethanol each and dried under vacuum.

The $\overline{MW}$ was determined on each sample by viscosimetry. The results are reported in FIG. 1.

We claim:

1. A process for depolymerization of linear polysaccharides, which comprises subjecting a polysaccharide to the action of atomic oxygen, thereby forming a depolymerized polysaccharide.

2. The process according to claim 1, wherein the atomic oxygen is generated from hypochlorous acid.

3. The process according to claim 1, wherein the polysaccharide is heparin.

4. The process according to claim 2, wherein the depolymerization is conducted in an aqueous solution at a pH in the range of 4 to 7 and at a temperature of 25° C. to 100° C.

5. The process according to claim 1, which comprises terminating the depolymerization by the addition of a reducing agent.

6. The process according to claim 1, which comprises precipitating the depolymerized polysaccharide by the addition of a water-miscible solvent.

7. A depolymerized heparin having therapeutically useful properties, said heparin having been formed according to the process of any one of claims 1 through 6.

8. A pharmaceutical composition comprising a pharmaceutically acceptable carrier and as a pharmaceutically active ingredient a heparin having therapeutically useful properties, said heparin having been formed according to the process of any one of claims 1 through 6.

9. The process according to claim 5, wherein the reducing agent is sodium bisulphite.

10. The process according to claim 6, wherein the water-miscible solvent is methanol, ethanol or acetone.

11. The process according to claim 4, wherein the depolymerization is conducted at a temperature of 50° C. to 80° C.

* * * * *

UNITED STATES PATENT AND TRADEMARK OFFICE
CERTIFICATE OF CORRECTION

PATENT NO. : 4,977,250

DATED : December 11, 1990

INVENTOR(S) : Victor Bautista DIAZ, Ricardo Hugo DOMANICO and Fernando FUSSI It is certified that error appears in the above-identified patent and that said Letters Patent is hereby corrected as shown below:

ON TITLE PAGE:     Item (73) ASSIGNEE:

change "AORCA S.A., Buenos Aires, Argentina"

to

--AJORCA S.A., Buenos Aires, Argentina--

Signed and Sealed this

Fourth Day of August, 1992

Attest:

DOUGLAS B. COMER

*Attesting Officer*     *Acting Commissioner of Patents and Trademarks*